United States Patent
Lam et al.

(10) Patent No.: US 9,666,860 B2
(45) Date of Patent: May 30, 2017

(54) OPTIMISED ENERGY STORAGE DEVICE HAVING CAPACITOR MATERIAL ON LEAD BASED NEGATIVE ELECTRODE

(75) Inventors: Lan Trieu Lam, Springvale (AU); Jun Furukawa, Fukushima (JP); Toshimichi Takada, Fukushima (JP); Daisuke Monma, Fukushima (JP); Tetsuya Kanou, Hangawa (JP)

(73) Assignees: COMMONWEALTH SCIENTIFIC AND INDUSTRIAL RESEARCH ORGANISATION, Campbell (AU); THE FURUKAWA BATTERY CO., LTD., Yokohama (JP)

( * ) Notice: Subject to any disclaimer, the term of this patent is extended or adjusted under 35 U.S.C. 154(b) by 646 days.

(21) Appl. No.: 12/531,956

(22) PCT Filed: Mar. 20, 2008

(86) PCT No.: PCT/AU2008/000405
§ 371 (c)(1),
(2), (4) Date: Mar. 1, 2010

(87) PCT Pub. No.: WO2008/113133
PCT Pub. Date: Sep. 25, 2008

(65) Prior Publication Data
US 2010/0175934 A1    Jul. 15, 2010

(30) Foreign Application Priority Data
Mar. 20, 2007  (AU) ................................ 2007901466

(51) Int. Cl.
*H01M 4/14*    (2006.01)
*H01M 4/62*    (2006.01)
(Continued)

(52) U.S. Cl.
CPC ............. *H01M 4/14* (2013.01); *H01M 4/621* (2013.01); *H01M 4/625* (2013.01); *H01M 4/627* (2013.01);
(Continued)

(58) Field of Classification Search
USPC ........................................................ 429/137
See application file for complete search history.

(56) References Cited

U.S. PATENT DOCUMENTS 2,938,063 A  *  5/1960  Greenburg et al. ........ 252/182.1
3,881,954 A     5/1975  Maskalick
(Continued)

FOREIGN PATENT DOCUMENTS

CN         1357899 A      7/2002
CN       101079510       11/2007
(Continued)

OTHER PUBLICATIONS

E. Frackowiak and F. Beguin, Carbon materials for the electrochemical storage of energy in capacitors, Review, Carbon 39 (2001) 937-950.*
(Continued)

*Primary Examiner* — Lucas J. O'Donnell
(74) *Attorney, Agent, or Firm* — Nixon & Vanderhye P.C.

(57) ABSTRACT

A lead-acid battery comprising: —at least one negative electrode comprising lead-based battery electrode material and at least one region of capacitor material overlying the lead-based battery electrode material, each electrode being in electrical connection to an outer terminal of the battery, and —at least one positive lead-dioxide based battery electrode, each positive electrode being in electrical connection to a second outer terminal of the battery, —separator interleaving the facing electrodes; —electrolyte filling at least the space of the electrodes and separators wherein the capacitor
(Continued)

material overlying the lead-based battery electrode material comprises 20-65% by weight of a high electrical conductivity carbonaceous material, 30-70% of a high specific surface area carbonaceous material, at least 0.1% lead and binder.

25 Claims, 1 Drawing Sheet

(51) Int. Cl.
  *H01M 10/06* (2006.01)
  *H01M 10/12* (2006.01)
  *H01M 4/02* (2006.01)
(52) U.S. Cl.
  CPC ......... *H01M 10/06* (2013.01); *H01M 10/121* (2013.01); *H01M 2004/021* (2013.01)

(56) References Cited

U.S. PATENT DOCUMENTS

| | | |
|---|---|---|
| 4,215,190 A | 7/1980 | Ferrando et al. |
| 4,422,987 A | 12/1983 | Arimatsu |
| 4,507,372 A | 3/1985 | Rowlette |
| 4,567,284 A | 1/1986 | Monzyk et al. |
| 4,576,879 A | 3/1986 | Nakazawa et al. |
| 4,770,954 A | 9/1988 | Noordenbos |
| 4,882,132 A | 11/1989 | Monzyk et al. |
| 4,975,253 A | 12/1990 | Monzyk et al. |
| 5,069,990 A | 12/1991 | Yoshimura et al. |
| 5,077,151 A | 12/1991 | Yasuda et al. |
| 5,154,989 A | 10/1992 | Howard et al. |
| 5,252,105 A | 10/1993 | Witherspoon et al. |
| 5,260,855 A | 11/1993 | Kaschmitter et al. |
| 5,384,685 A | 1/1995 | Tong et al. |
| 5,393,617 A | 2/1995 | Klein |
| 5,419,977 A | 5/1995 | Weiss et al. |
| 5,429,893 A | 7/1995 | Thomas |
| 5,439,756 A | 8/1995 | Anani et al. |
| 5,455,999 A | 10/1995 | Weiss et al. |
| 5,458,043 A | 10/1995 | Jensen et al. |
| 5,464,453 A | 11/1995 | Tong et al. |
| 5,491,399 A | 2/1996 | Gregory et al. |
| 5,518,833 A | 5/1996 | Repplinger et al. |
| 5,526,223 A | 6/1996 | Wu et al. |
| 5,529,971 A | 6/1996 | Kaschmitter et al. |
| 5,534,369 A | 7/1996 | Nagaura |
| 5,547,783 A | 8/1996 | Funato et al. |
| 5,574,353 A | 11/1996 | Bai et al. |
| 5,587,250 A | 12/1996 | Thomas et al. |
| 5,604,426 A | 2/1997 | Okamura et al. |
| 5,626,729 A | 5/1997 | Thompson et al. |
| 5,670,266 A | 9/1997 | Thomas et al. |
| 5,705,259 A | 1/1998 | Mrotek et al. |
| 5,744,258 A | 4/1998 | Bai et al. |
| 5,781,403 A | 7/1998 | Aoki et al. |
| 5,789,338 A | 8/1998 | Kaschmitter et al. |
| 5,821,006 A | 10/1998 | Patel et al. |
| 5,821,007 A | 10/1998 | Harshe et al. |
| 5,849,426 A | 12/1998 | Thomas et al. |
| 5,916,699 A | 6/1999 | Thomas et al. |
| 5,935,724 A | 8/1999 | Spillman et al. |
| 5,935,728 A | 8/1999 | Spillman et al. |
| 5,960,898 A | 10/1999 | Okada et al. |
| 5,993,983 A | 11/1999 | Rozon |
| 6,005,764 A | 12/1999 | Anderson et al. |
| 6,011,379 A | 1/2000 | Singh et al. |
| 6,072,691 A | 6/2000 | Suhara et al. |
| 6,087,812 A | 7/2000 | Thomas et al. |
| 6,088,217 A | 7/2000 | Patel et al. |
| 6,117,585 A | 9/2000 | Anani et al. |
| 6,190,805 B1 | 2/2001 | Takeuchi et al. |
| 6,195,252 B1 | 2/2001 | Belyakov et al. |
| 6,208,502 B1 | 3/2001 | Hudis et al. |
| 6,208,878 B1 | 3/2001 | Hattori et al. |
| 6,222,723 B1 | 4/2001 | Razoumov et al. |
| 6,252,762 B1 | 6/2001 | Amatucci |
| 6,294,893 B1 | 9/2001 | De Abreu |
| 6,304,467 B1 | 10/2001 | Nebrigic |
| 6,310,789 B1 | 10/2001 | Nebrigic et al. |
| 6,316,563 B2 | 11/2001 | Naijo et al. |
| 6,331,365 B1 | 12/2001 | King |
| 6,333,123 B1 | 12/2001 | Davis et al. |
| 6,466,429 B1 | 10/2002 | Volfkovich et al. |
| 6,509,116 B1 | 1/2003 | Kurosaki et al. |
| 6,509,713 B2 | 1/2003 | De Abreu |
| 6,517,972 B1 | 2/2003 | Amatucci |
| 6,541,140 B1 | 4/2003 | Spillman et al. |
| 6,576,365 B1 | 6/2003 | Meitav et al. |
| 6,585,915 B2 | 7/2003 | Shinozaki et al. |
| 6,610,440 B1 | 8/2003 | LaFollette et al. |
| 6,623,884 B1 | 9/2003 | Spillman et al. |
| 6,628,504 B2 | 9/2003 | Volfkovich et al. |
| 6,631,073 B1 | 10/2003 | Sakata et al. |
| 6,643,151 B1 | 11/2003 | Nebrigic et al. |
| 6,646,415 B1 | 11/2003 | Nebrigic et al. |
| 6,653,014 B2 | 11/2003 | Anderson et al. |
| 6,680,600 B2 | 1/2004 | Emori et al. |
| 6,687,116 B2 | 2/2004 | Hudis |
| 6,706,079 B1 | 3/2004 | Shmatko et al. |
| 6,737,822 B2 | 5/2004 | King |
| 6,749,963 B2 | 6/2004 | Kurosaki et al. |
| 6,765,363 B2 | 7/2004 | LaFollette et al. |
| 6,869,731 B2 | 3/2005 | Nobuta et al. |
| 6,887,617 B2 | 5/2005 | Sato et al. |
| 6,911,273 B2 | 6/2005 | Faris |
| 7,006,346 B2 | 2/2006 | Volfkovich et al. |
| 7,035,084 B2 | 4/2006 | Kaneko et al. |
| 7,049,792 B2 | 5/2006 | King |
| 7,057,880 B2 | 6/2006 | Kurosaki et al. |
| 7,074,688 B2 | 7/2006 | Kurihara et al. |
| 7,083,876 B2 | 8/2006 | Honbo et al. |
| 7,110,242 B2 | 9/2006 | Adrianov et al. |
| 7,119,047 B1 | 10/2006 | Adrianov et al. |
| 7,144,654 B2 | 12/2006 | LaFollette et al. |
| 7,166,384 B2 | 1/2007 | LaFollette et al. |
| 7,186,473 B2 | 3/2007 | Shiue et al. |
| 7,358,008 B2 | 4/2008 | Nanno et al. |
| 7,397,650 B2 | 7/2008 | Sato et al. |
| 7,420,295 B2 | 9/2008 | Omae et al. |
| 7,462,419 B2 | 12/2008 | LaFollette et al. |
| 7,468,221 B2 | 12/2008 | LaFollette et al. |
| 7,649,335 B2 | 1/2010 | Ishikawa et al. |
| 7,742,279 B2 | 6/2010 | Takahashi et al. |
| 7,862,931 B2 | 1/2011 | Furukawa et al. |
| 8,017,273 B2 | 9/2011 | Lara-Curzio et al. |
| 8,057,937 B2 | 11/2011 | Sung et al. |
| 2001/0009734 A1 | 7/2001 | Clough |
| 2001/0011119 A1 | 8/2001 | Naijo et al. |
| 2001/0033501 A1 | 10/2001 | Nebrigic |
| 2001/0044045 A1 | 11/2001 | Sato et al. |
| 2002/0036478 A1 | 3/2002 | De Abreu |
| 2002/0037452 A1 | 3/2002 | Schmidt |
| 2002/0058185 A1 | 5/2002 | Kurosaki et al. |
| 2002/0096661 A1 | 7/2002 | Shinozaki et al. |
| 2002/0132164 A1 | 9/2002 | Kaneko et al. |
| 2002/0155327 A1 | 10/2002 | Faris |
| 2002/0158606 A1 | 10/2002 | King |
| 2002/0161146 A1 | 10/2002 | Naijo et al. |
| 2002/0163771 A1 | 11/2002 | Volfkovich et al. |
| 2002/0176221 A1 | 11/2002 | Hudis |
| 2002/0182485 A1 | 12/2002 | Anderson et al. |
| 2002/0196597 A1 | 12/2002 | Volfkovich et al. |
| 2003/0006737 A1 | 1/2003 | LaFollette et al. |
| 2003/0007317 A1 | 1/2003 | Hudis |
| 2003/0008212 A1 | 1/2003 | Akashi et al. |
| 2003/0011964 A1 | 1/2003 | Hudis |
| 2003/0035982 A1 | 2/2003 | Ryu et al. |
| 2003/0049528 A1 | 3/2003 | Honbo |
| 2003/0070916 A1 | 4/2003 | Nanno et al. |
| 2003/0091905 A1 | 5/2003 | Nobuta et al. |
| 2003/0094923 A1 | 5/2003 | Emori et al. |
| 2003/0129458 A1 | 7/2003 | Bailey |

(56) References Cited

U.S. PATENT DOCUMENTS

| | | |
|---|---|---|
| 2003/0152815 A1 | 8/2003 | LaFollette et al. |
| 2003/0188901 A1 | 10/2003 | Ovshinsky et al. |
| 2003/0219653 A1 | 11/2003 | Kelley et al. |
| 2003/0232238 A1* | 12/2003 | Fleming et al. ............... 429/94 |
| 2004/0009161 A1 | 1/2004 | Escary |
| 2004/0018421 A1 | 1/2004 | LaFollette et al. |
| 2004/0038087 A1 | 2/2004 | Shiue et al. |
| 2004/0053124 A1 | 3/2004 | LaFollette et al. |
| 2004/0057194 A1 | 3/2004 | Hudis |
| 2004/0091777 A1 | 5/2004 | Lam et al. |
| 2004/0112486 A1* | 6/2004 | Aust et al. ............... 148/706 |
| 2004/0121204 A1 | 6/2004 | Adelman et al. |
| 2004/0141282 A1 | 7/2004 | Hudis |
| 2004/0142243 A1 | 7/2004 | Furukawa et al. |
| 2004/0161640 A1 | 8/2004 | Salot |
| 2004/0189226 A1 | 9/2004 | King |
| 2004/0209165 A1 | 10/2004 | Kurosaki et al. |
| 2004/0246658 A1 | 12/2004 | Adrianov et al. |
| 2005/0002150 A1 | 1/2005 | Volfkovich et al. |
| 2005/0081350 A1 | 4/2005 | Kurihara et al. |
| 2005/0089728 A1 | 4/2005 | Arai et al. |
| 2005/0093380 A1 | 5/2005 | LaFollette et al. |
| 2005/0110457 A1 | 5/2005 | LaFollette et al. |
| 2005/0112420 A1 | 5/2005 | Lai et al. |
| 2005/0147885 A1 | 7/2005 | Sato et al. |
| 2005/0170242 A1 | 8/2005 | Sato et al. |
| 2005/0221191 A1* | 10/2005 | Kondo et al. ............... 429/245 |
| 2005/0253458 A1 | 11/2005 | Omae et al. |
| 2005/0260497 A1 | 11/2005 | Kumashiro et al. |
| 2006/0038536 A1 | 2/2006 | LaFollette et al. |
| 2006/0115732 A1 | 6/2006 | Zaghib et al. |
| 2006/0172196 A1 | 8/2006 | Fukunaga |
| 2006/0223701 A1 | 10/2006 | Adrianov et al. |
| 2006/0269801 A1* | 11/2006 | Honbo et al. ............... 429/7 |
| 2007/0104981 A1 | 5/2007 | Lam et al. |
| 2007/0128472 A1 | 6/2007 | Tierney et al. |
| 2007/0247787 A1 | 10/2007 | Nakagawa et al. |
| 2008/0197810 A1 | 8/2008 | Ishikawa et al. |
| 2008/0199737 A1 | 8/2008 | Kazaryan et al. |
| 2008/0264291 A1* | 10/2008 | Pike et al. ............... 105/50 |
| 2008/0318135 A1 | 12/2008 | Sung et al. |
| 2009/0059474 A1 | 3/2009 | Zhamu et al. |
| 2009/0272946 A1 | 11/2009 | Lu |
| 2009/0291360 A1 | 11/2009 | Kim et al. |
| 2010/0015531 A1 | 1/2010 | Dickinson et al. |
| 2010/0075210 A1 | 3/2010 | Lee et al. |
| 2010/0203362 A1* | 8/2010 | Lam et al. ............... 429/7 |
| 2010/0214722 A1 | 8/2010 | Fujii et al. |
| 2011/0151286 A1 | 6/2011 | Lam et al. |
| 2011/0177392 A1 | 7/2011 | Hoshiba |
| 2012/0094174 A1 | 4/2012 | Furukawa et al. |
| 2012/0244429 A1 | 9/2012 | Lam et al. |
| 2012/0258336 A1 | 10/2012 | Furukawa et al. |
| 2012/0263977 A1 | 10/2012 | Furukawa et al. |
| 2014/0127565 A1 | 5/2014 | Furukawa et al. |

FOREIGN PATENT DOCUMENTS

| | | |
|---|---|---|
| CN | 101132065 | 2/2008 |
| CN | 101414691 A | 4/2009 |
| EP | 0 354 966 B1 | 1/1989 |
| EP | 0 354 966 A1 | 7/1989 |
| EP | 0 555 422 B1 | 2/1992 |
| EP | 0 662 726 A2 | 12/1994 |
| EP | 0 662 726 A3 | 12/1994 |
| EP | 0 801 834 B1 | 4/1996 |
| EP | 0 934 607 B1 | 9/1997 |
| EP | 0 964 416 A1 | 11/1997 |
| EP | 0 851 445 A2 | 12/1997 |
| EP | 0 851 445 B1 | 12/1997 |
| EP | 0 872 908 A1 | 4/1998 |
| EP | 0 872 908 B1 | 4/1998 |
| EP | 0 893 790 A2 | 7/1998 |
| EP | 0 893 790 B1 | 7/1998 |
| EP | 1 115 130 A1 | 8/1999 |
| EP | 1 000 796 A2 | 11/1999 |
| EP | 1 190 480 B1 | 6/2000 |
| EP | 1 071 148 A2 | 7/2000 |
| EP | 1 071 148 B1 | 7/2000 |
| EP | 1 126 536 A2 | 2/2001 |
| EP | 1 126 536 B1 | 2/2001 |
| EP | 1 179 871 A2 | 8/2001 |
| EP | 1 189 295 A2 | 9/2001 |
| EP | 1 189 295 B1 | 9/2001 |
| EP | 1 251 576 A2 | 4/2002 |
| EP | 1 315 227 A2 | 4/2002 |
| EP | 1 391 961 A1 | 8/2002 |
| EP | 1 391 961 B1 | 8/2002 |
| EP | 1 309 028 A2 | 10/2002 |
| EP | 1 309 028 B1 | 10/2002 |
| EP | 1 418 428 A1 | 11/2002 |
| EP | 1 496 556 A1 | 4/2003 |
| EP | 1 496 556 B1 | 4/2003 |
| EP | 1 541 422 A1 | 7/2003 |
| EP | 1 775 786 A1 | 7/2003 |
| EP | 1 561 105 B1 | 11/2003 |
| EP | 1 783 792 A1 | 7/2004 |
| EP | 1 386 336 B1 | 1/2006 |
| EP | 2 184 796 A1 | 7/2007 |
| FR | 2692077 | 12/1993 |
| JP | S59-105266 | 6/1984 |
| JP | 61-283173 | 12/1986 |
| JP | 62-103976 | 5/1987 |
| JP | 03-129667 | 6/1991 |
| JP | 04 043557 A | 2/1992 |
| JP | 4061214 | 2/1992 |
| JP | 4-233170 | 8/1992 |
| JP | 4-294515 | 10/1992 |
| JP | H06-128317 | 5/1994 |
| JP | 09-092272 | 4/1997 |
| JP | 10 021900 A | 1/1998 |
| JP | 10-50565 | 2/1998 |
| JP | 10-294135 | 11/1998 |
| JP | 11-97319 | 4/1999 |
| JP | 11-224699 | 8/1999 |
| JP | 2000-1595 | 1/2000 |
| JP | 2000-13915 | 1/2000 |
| JP | 2000-21408 | 1/2000 |
| JP | 2000-235858 | 8/2000 |
| JP | 2001-110418 | 4/2001 |
| JP | 2001-126757 | 5/2001 |
| JP | 2001-313237 | 11/2001 |
| JP | 2001-319655 | 11/2001 |
| JP | 2001-332264 | 11/2001 |
| JP | 2001-351688 | 12/2001 |
| JP | 2002-47372 | 2/2002 |
| JP | 2002-50543 | 2/2002 |
| JP | 2002-50544 | 2/2002 |
| JP | 2002-75788 | 3/2002 |
| JP | 2002-118036 | 4/2002 |
| JP | 2002-298853 | 10/2002 |
| JP | 2002-367613 | 12/2002 |
| JP | 2003-51306 | 2/2003 |
| JP | 2003-51306 A | 2/2003 |
| JP | 2003-77458 | 3/2003 |
| JP | 2003-87988 | 3/2003 |
| JP | 2003-132941 | 5/2003 |
| JP | 2003-200739 | 7/2003 |
| JP | 2003-308696 | 10/2003 |
| JP | 2004-047613 A2 | 2/2004 |
| JP | 2004-55240 | 2/2004 |
| JP | 2004-55541 | 2/2004 |
| JP | 2004-134369 | 4/2004 |
| JP | 2004-221523 | 8/2004 |
| JP | 2004-273443 | 9/2004 |
| JP | 2004-355823 | 12/2004 |
| JP | 2005-32938 | 2/2005 |
| JP | 2005-050582 | 2/2005 |
| JP | 2005-80470 | 3/2005 |
| JP | 2005-160271 | 6/2005 |
| JP | 2005-183632 | 7/2005 |
| JP | 2005-248653 | 9/2005 |
| JP | 2005-294497 | 10/2005 |
| JP | 2005-327489 | 11/2005 |

(56) References Cited

FOREIGN PATENT DOCUMENTS

| | | |
|---|---|---|
| JP | 2005-353652 | 12/2005 |
| JP | 2006-156002 | 6/2006 |
| JP | 2006-252902 | 9/2006 |
| JP | 2006-310628 | 11/2006 |
| JP | 2006-325331 | 11/2006 |
| JP | 2007-12596 | 1/2007 |
| JP | 2007-506230 | 3/2007 |
| JP | 2007-226996 | 9/2007 |
| JP | 2007-280803 | 10/2007 |
| JP | 2008-22605 | 1/2008 |
| JP | 2008-047452 A2 | 2/2008 |
| JP | 2008-146898 A2 | 6/2008 |
| JP | 2008-150270 | 7/2008 |
| JP | 2008-171766 | 7/2008 |
| JP | 2009-104827 | 5/2009 |
| JP | 2009-135056 | 6/2009 |
| JP | 2009-219960 | 10/2009 |
| TW | I268005 | 12/2006 |
| WO | WO89/06865 A1 | 7/1989 |
| WO | WO92/11174 A1 | 7/1992 |
| WO | WO93/05541 A1 | 3/1993 |
| WO | WO93/14511 A1 | 7/1993 |
| WO | WO94/07272 A1 | 3/1994 |
| WO | WO95/21466 | 8/1995 |
| WO | WO95/23437 A1 | 8/1995 |
| WO | WO96/11522 | 4/1996 |
| WO | WO 96/12313 | 4/1996 |
| WO | WO96/17361 | 6/1996 |
| WO | WO96/30959 | 10/1996 |
| WO | WO97/12415 | 4/1997 |
| WO | WO98/08266 | 2/1998 |
| WO | WO98/19357 | 5/1998 |
| WO | WO98/24100 | 6/1998 |
| WO | WO98/40925 | 9/1998 |
| WO | WO98/40926 A1 | 9/1998 |
| WO | WO98/54816 | 12/1998 |
| WO | WO99/24996 | 5/1999 |
| WO | WO00/02213 | 1/2000 |
| WO | WO00/11688 | 3/2000 |
| WO | WO00/63929 | 10/2000 |
| WO | WO01/01553 A1 | 1/2001 |
| WO | WO01/17054 A1 | 3/2001 |
| WO | WO01/41232 A2 | 6/2001 |
| WO | WO01/95410 A1 | 12/2001 |
| WO | WO02/01655 A2 | 1/2002 |
| WO | WO 02/052664 A2 | 7/2002 |
| WO | WO02/087006 | 10/2002 |
| WO | WO02/091412 A1 | 11/2002 |
| WO | WO02/099956 A2 | 12/2002 |
| WO | WO03/036670 A2 | 5/2003 |
| WO | WO03/055791 A2 | 7/2003 |
| WO | WO03/077333 A1 | 9/2003 |
| WO | WO03/088385 A1 | 10/2003 |
| WO | WO03/094184 A1 | 11/2003 |
| WO | WO03/098648 A1 | 11/2003 |
| WO | WO2004/008560 A2 | 1/2004 |
| WO | WO2004/012964 A1 | 2/2004 |
| WO | WO2004/038051 A1 | 5/2004 |
| WO | WO2004/042394 A2 | 5/2004 |
| WO | WO2005/027255 A1 | 3/2005 |
| WO | WO2005/041343 A1 | 5/2005 |
| WO | WO2006/006218 A1 | 1/2006 |
| WO | WO2006/062349 A1 | 6/2006 |
| WO | WO2006/109909 A1 | 10/2006 |
| WO | WO2006/132052 A2 | 12/2006 |
| WO | WO2007/017506 A1 | 2/2007 |
| WO | WO 2007/034873 | 3/2007 |
| WO | WO 2007/050466 | 5/2007 |
| WO | WO2007/058421 A1 | 5/2007 |
| WO | WO2007/097534 A1 | 8/2007 |
| WO | WO2008/016236 A1 | 2/2008 |
| WO | WO 2008/051885 | 5/2008 |
| WO | WO2008/070914 A1 | 6/2008 |
| WO | WO2008/101190 A1 | 8/2008 |
| WO | WO2008/113133 A1 | 9/2008 |
| WO | WO2009/013796 A1 | 1/2009 |
| WO | WO2009/041180 A1 | 4/2009 |
| WO | WO2009/071292 A1 | 6/2009 |
| WO | WO 2009/005170 | 8/2009 |
| WO | WO2009/094931 A1 | 8/2009 |
| WO | WO2009/101047 A1 | 8/2009 |
| WO | WO2009/128482 A1 | 10/2009 |
| WO | 2010122873 | 10/2010 |

OTHER PUBLICATIONS

International Search Report for PCT/AU2008/000405, mailed May 20, 2008.
Derwent Abstract Accession No. 2006-110075/11, Osaka Gas Co Ltd., (Jan. 19, 2006), 2 pages.
Derwent Abstract Accession No. 2004-683934/67, Mitsubishi Chem Corp., (Sep. 30, 2004), 2 pages.
Derwent Abstract Accession No. 2004-395525/37, Shin Kobe Electric Machinery., (Apr. 30, 2004), 2 pages.
Derwent Abstract Accession No. 2005-135458/15, TDK Corp., (Jan. 27, 2005), 2 pages.
International Search Report of PCT/AU2004/001262, mailed Nov. 8, 2004.
Examiner's Report No. 2 on Australian Patent Appln. No. 2004273104 dated Sep. 21, 2009.
Lam et al, "Development of ultra-battery for hybrid-electric vehicle applications", Journal of Power Sources 158 (2006) 1140-1140.
English translation of JP Office Action in 2009-540546 mailed Nov. 8, 2013.
Chinese Patent Application No. 201080047297.07—First Notification of Office Action (English translation included), mailed Apr. 3, 2014.
European Patent Application No. 10814794.3—Search Report, mailed Dec. 2, 2013.
Japanese Patent Application No. 2012-52822—Office Action (English translation included), mailed Apr. 22, 2014.
International Search Report for PCT/AU2007/001916, mailed Feb. 21, 2008.
International Search Report for PCT/JP2010/055479, mailed Jun. 22, 2010.
International Search Report for PCT/AU2010/001113, mailed Oct. 27, 2010.
International Search Report for PCT/JP2010/0649984, mailed Nov. 22, 2010.
International Search Report for PCT/JP2010/064985, mailed Nov. 30, 2010.
International Search Report for PCT/AU2011/001647, mailed Mar. 23, 2012.
Derwent Abstract Accession No. 2006-643026/67 & JP 2006-252902 (Kawasaki Heavy Ind Ltd.), Sep. 21, 2006 (2 pages).
Derwent Abstract Accession No. 2006-003619/01 & JP 2005-327489 (Matsuhita Denki Sangyo KK.), Nov. 24, 2005 (2 pages).
Derwent Abstract Accession No. 2006-036969/05 & JP 2006-310628 (Nippon Zeon KK), Nov. 9, 2006 (2 pages).
Office Action issued in U.S. Appl. No. 12/518,521 dated Oct. 25, 2012.
Office Action issued in U.S. Appl. No. 12/518,521 dated Jan. 17, 2013.
Office Action issued in U.S. Appl. No. 12/518,521 dated Nov. 6, 2013.
Office Action issued in U.S. Appl. No. 12/518,521 dated Jun. 9, 2014.
Office Action issued in U.S. Appl. No. 12/518,521 dated Mar. 10, 2015.
Office Action issued in U.S. Appl. No. 13/265,944 dated Dec. 24, 2014.
Office Action issued in U.S. Appl. No. 13/265,944 dated Apr. 9, 2015.
Office Action issued in U.S. Appl. No. 13/392,774 dated Sep. 30, 2014.
Office Action issued in U.S. Appl. No. 13/392,774 dated May 21, 2015.

(56) References Cited

OTHER PUBLICATIONS

Office Action issued in U.S. Appl. No. 13/392,734 dated Jul. 7, 2014.
Office Action issued in U.S. Appl. No. 13/392,734 dated Feb. 27, 2015.
Office Action issued in U.S. Appl. No. 13/392,651 dated Jan. 17, 2013.
Office Action issued in U.S. Appl. No. 13/392,651 dated Oct. 25, 2013.
Office Action issued in U.S. Appl. No. 13/392,651 dated Jun. 18, 2014.
Office Action issued in U.S. Appl. No. 13/392,651 dated Dec. 9, 2014.
Office Action issued in U.S. Appl. No. 13/392,651 dated Apr. 6, 2015.
Office Action issued in U.S. Appl. No. 12/531,956 dated Feb. 21, 2012.
Office Action issued in U.S. Appl. No. 12/531,956 dated Aug. 1, 2012.
Office Action issued in U.S. Appl. No. 12/531,956 dated May 9, 2013.
Office Action issued in U.S. Appl. No. 12/531,956 dated Nov. 22, 2013.
Office Action issued in U.S. Appl. No. 12/531,956 dated Apr. 17, 2014.
Office Action issued in U.S. Appl. No. 12/531,956 dated Nov. 6, 2014.
Russian Patent Application No. 2012111222—Office Action (English translation included), mailed Aug. 27, 2014.
Russian Patent Application No. 2012111683—Office Action (English translation included), mailed Sep. 3, 2014.
Office Action issued in U.S. Appl. No. 13/392,651 dated Mar. 23, 2016.
U.S. Patent and Trademark Office, "Non-Final Office Action," issued in connection with U.S. Appl. No. 13/996,934, dated Jul. 9, 2014 (30 pages).
Office Action issued in U.S. Appl. No. 13/265,944 dated Oct. 27, 2015.
Office Action issued in U.S. Appl. No. 13/392,651 dated Oct. 13, 2015.
Office Action issued in U.S. Appl. No. 13/392,734 dated Oct. 7, 2015.
Office Action issued in U.S. Appl. No. 13/392,734 dated Dec. 24, 2015.

\* cited by examiner

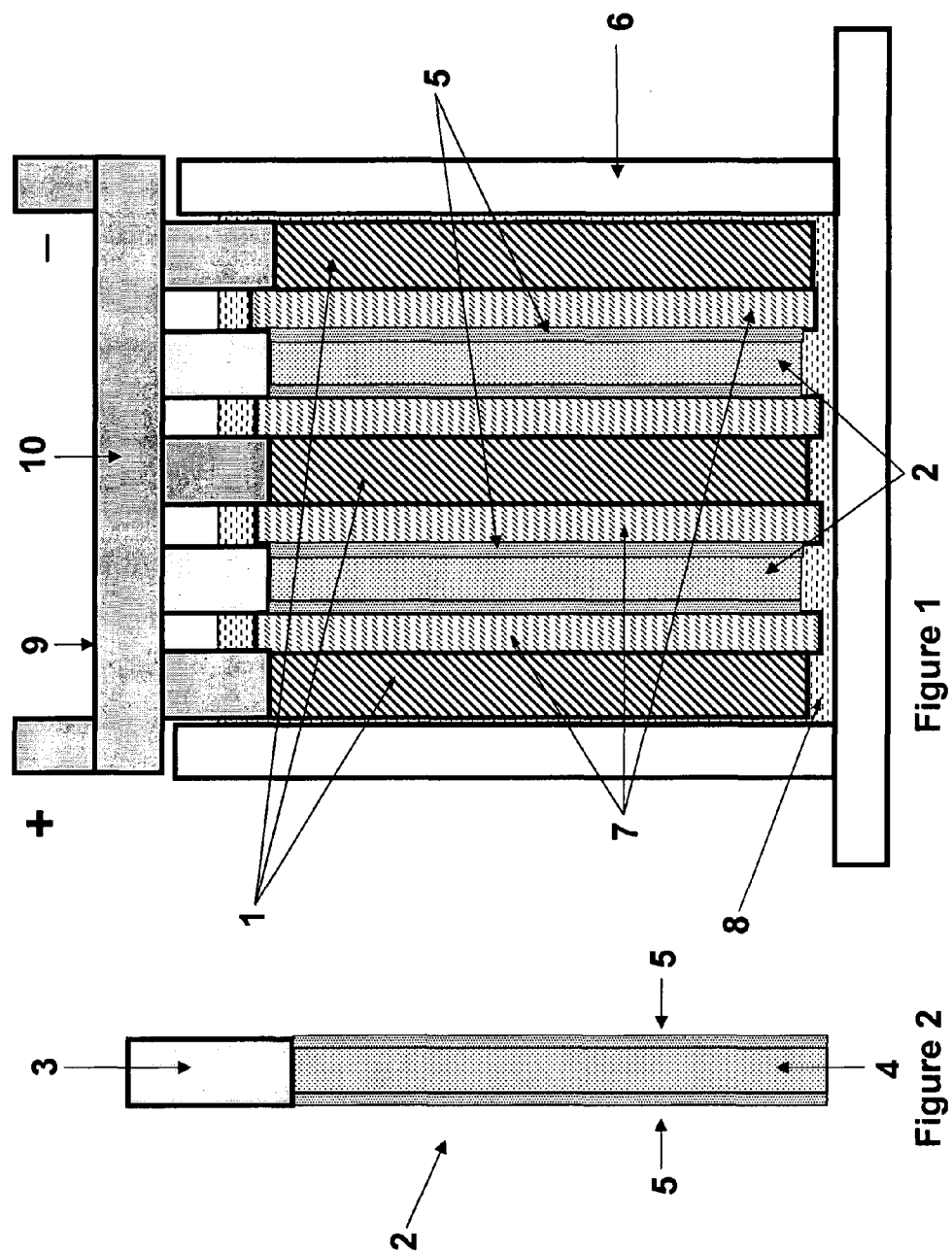

1

OPTIMISED ENERGY STORAGE DEVICE HAVING CAPACITOR MATERIAL ON LEAD BASED NEGATIVE ELECTRODE

This application is the U.S. national phase of International Application No. PCT/AU2008/000405 filed 20 Mar. 2008, which designated the U.S. and claims priority to AU Application No. 2007901466 filed 20 Mar. 2007, the entire contents of each of which are hereby incorporated by reference.

BACKGROUND

The present invention relates to energy storage devices, including batteries such as lead-acid batteries.

There is growing demand for the development and introduction of vehicles that do not rely almost entirely on fossil fuels, to combat air pollution in urban environments and to reduce the global consumption of limited supplies of the fossil fuels. Such vehicles fall into three main classes: fuel-cell vehicles (FCVs), electric vehicles (EVs), hybrid electric vehicles (HEVs). There are several types of hybrid electric vehicles, namely, micro-, mild-, medium- and full-hybrid. The battery voltage of the hybrid electric vehicles increases in the order: 12 V in micro hybrid, 36 V in mild hybrid, 144 V in medium hybrid and over 200 V in full hybrid. On the other hand, the battery capacity decreases in the order: 50-60 Ah in micro hybrid, 15-20 Ah in mild hybrid, 6-8 Ah in medium hybrid and 6 Ah in full hybrid.

Electric vehicles and hybrid electric vehicles may use a variety of different battery types, including lead-acid batteries. Micro and Mild hybrid electric vehicles may use mainly lead-acid batteries because of reduced cost. Hybrid electric vehicles rely on a combination of an internal combustion engine and a battery for power supply. The hybrid electric vehicles provide some advantages over the existing internal combustion engine cars, including higher use of the electrically generated power, resulting in lower emissions and less fuel consumption.

Whilst there have been many significant advances in the development of new batteries and power networks for vehicles relying at least partly on electric power, the batteries used in these vehicles still suffer from a number of problems.

In all of these batteries, different demands are placed on the battery in terms of the current drawn from and recharged to the battery at various stages during vehicle operation. In the case of vehicle applications, as one example, a high rate of discharge is needed from the battery to enable acceleration in electric vehicles, or acceleration as well as engine cranking in hybrid electric vehicles. A high rate of recharging of the battery is associated with regenerative braking. In such high rate applications (and in high charging applications for the batteries) the battery preferably needs to be able to supply the high rate of discharge over a period of 1 minute or more.

In the situation where lead-acid batteries are utilized, particularly in hybrid electric vehicles, the high rate of battery discharging and recharging results in the formation of a layer of lead sulphate on the surface of the negative plate, and the generation of hydrogen/oxygen at the negative and positive plates. This largely arises as a result of high current demands on the battery. The partial state-of-charge conditions (PSoC) under which these batteries generally operate is 20-100% for electric vehicles, 40-70% for medium and full hybrid electric vehicles, and 70-90% for micro and mild hybrid electric vehicles. This is a high rate partial state-of-charge (HRPSoC). Under simulated HRPSoC duty, such as hybrid electric vehicle operations, the lead-acid batteries fail prematurely mainly due to the progressive accumulation of lead sulphate on the surfaces of the negative plates. This occurs because the lead sulphate cannot be converted efficiently back to sponge lead during charging either from the regenerative braking or from the engine. Eventually, this layer of lead sulphate develops to such an extent that the effective surface area of the plate is reduced markedly, and the plate can no longer deliver the higher current demanded from the automobile. This significantly reduces the potential life span of the battery.

In other technology fields, it would be advantageous to provide alternative battery types that offer improved overall lifespan and performance whilst catering for the different power demands on the battery.

Accordingly, there exists a need for modified batteries, such as lead-acid batteries, that have an improved life span and/or improved overall performance compared to current batteries. There is also a need to identify components of the battery that can be modified to improve performance, in terms of a balance of capacity and lifespan.

SUMMARY OF THE INVENTION

According to one aspect, there is provided a lead-acid battery comprising:
  at least one negative electrode comprising lead-based battery electrode material and at least one region of capacitor material overlying the lead-based battery electrode material, each electrode being in electrical connection to an outer terminal of the battery,
  at least one positive lead-dioxide based battery electrode, each positive electrode being in electrical connection to a second outer terminal of the battery,
  separator interleaving the facing electrodes, and
  electrolyte filling at least the space of the electrodes and separators
  wherein the capacitor material overlying the lead-based battery electrode material comprises 20-65% by weight of a high electrical conductivity carbonaceous material, 30-70% of a high specific surface area carbonaceous material, lead and binder.

Preferably the lead content in the capacitor material is at least 0.1% by weight.

Preferably the binder is present in an amount of between 1-30% by weight, preferably 5 and 20% by weight.

The capacitor material may further comprise fiber reinforcement material in an amount of from 0 to 10% by weight.

According to one embodiment, the capacitor material consists of 21-65% high electrical conductivity carbonaceous material, 35-65% high specific surface area carbonaceous material, 3-40% lead, 5-20% binder and 2-10% fiber reinforcement material.

It has been found that the layer-configuration provides the optimal working of the battery, particularly with the amounts of carbonaceous materials in the capacitor material described above. Moreover, it has been found that the capacitor material of each negative electrode should constitute between 1 and 15% by weight of the negative battery electrode material. Below 1% is insufficient for minimum performance requirements of the device. Above 10% it has been found that saturation is reached, such that the further weight increase does not further increase performance. Nevertheless, other than cost and weight consideration, an increase in the mass of capacitor material above 10% is acceptable to a level of about 15%.

It has been found that layer-configuration provides the substantial area of cohesive interface between capacitor material and battery material which is formed through the reaction with lead battery material and carbonaceous capacitor material, resulting in enhanced mechanical strength and reduced electrical resistance of the electrode. Along with these beneficial effects, a greater lead content in the capacitor material is transferred during operation from the battery material directly contacting with capacitor material which controls electrode potential enough to depress gassing.

It has been found that for most effective operation, a layer of capacitor material overlies all effective areas of the negative electrode that face a positive electrode. Generally, negative electrodes in lead acid batteries comprise a current collector (which may be in the form of a grid), which is coated on both faces with lead-based battery electrode material. Although only parts or single-faces of the negative electrode may be overlaid by capacitor material, it is preferred that the negative electrode comprises a current collector coated with lead-acid battery material, and a layer of capacitor material overlying each face of lead-acid battery material that is opposite to a positive electrode.

It is noted that during production, prior to application of the capacitor material onto the negative battery electrode material-coated negative electrode, this electrode may be formed or unformed.

Preferably, the capacitor material overlying the lead-based battery electrode material has a porosity of between 50-90%.

According to one embodiment, the positive electrode will generally comprise a positive current collector (which may be in the form of a grid), formed from a lead alloy. Preferably the lead alloy comprises 0.005-0.015% by weight Ba, 0.03-0.08% by weight Ca, 0.4-2.2% by weight Sn, and lead. Preferably lead constitutes the balance of the alloy material. This alloy material is most suited as it has high corrosion resistance for batteries of the claimed type.

The battery may be a valve regulated lead acid battery. Preferably in this battery type the battery comprises absorptive glass microfibre or absorbed glass mat (AGM) separators between adjacent electrodes. Further, the valve regulated lead acid battery preferably has a pressure on electrodes of between 20 and 100 kPa.

When the battery is of the valve regulated lead acid-type, this is preferably operated at between 95-60% State-of-charge (SoC), but it may be between 95-30% SoC.

The battery may be of the flooded electrolyte type. In this case, it is preferred that the pressure on the electrodes is between 5 and 45 kPa. In this embodiment, it is preferred that porous polymer separators such as porous polyethylene membrane separators be located between adjacent positive and negative electrodes. The porous polyethylene separators may optionally further comprise unwoven fibrous material reinforcement.

When the battery is of the flooded electrolyte type, it is preferably operated at between 98-80% SoC. In automotive applications, the vehicle preferably comprises the flooded electrolyte battery, internal combustion engine and an alternator, and provides electricity to the vehicle for idle, stop and start operations.

Preferably, the lead-acid battery comprises an alternating series of positive and negative electrodes.

BRIEF DESCRIPTION OF THE DRAWINGS

FIG. 1 is a schematic side view of a lead-acid battery in accordance with one embodiment of the invention.

FIG. 2 is a schematic plan view of the lead-acid battery of FIG. 1.

DETAILED DESCRIPTION OF THE INVENTION

The present invention will now be described in further detail with reference to preferred embodiments of the invention.

To avoid any doubt, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

General Features

The term "lead-acid battery" is used in its broadest sense to encompass any unit containing one or more lead-acid battery cells.

The lead-acid batteries described contain at least one negative electrode comprising a coating of lead-based battery electrode material and at least one overlying region of capacitor material, and at least one lead dioxide-based positive electrode.

Electrode Structure

Electrodes generally comprise a current collector (otherwise known as a grid or plate), with the active battery electrode material applied thereto. The active battery electrode material is most commonly applied in a paste form to the current collector, and in the present specification the term paste applies to all such active-material containing compositions applied in any way to the current collector. The term "based" used in the context of electrodes is intended to refer to the active electrode material. This term is used to avoid suggesting that the electrode is formed entirely from the active material, as this is not the case. The term also is intended to indicate that the active material of the given electrode may contain additives or materials other than the active material specifically mentioned.

Electrodes

The negative and positive electrodes (prior to application of capacitor material) may be of any arrangement or type suitable for use in a lead-acid battery. Generally, such electrodes are in the form of a current collector or metal grid (usually made from lead or lead alloy) that supports the electrochemically active material (lead or lead dioxide) which is pasted onto the grid. The operation of pasting is well known in the field. It is to be noted that, prior to formation of the battery, the active material may not be in the active form (i.e. it may not be in the form of the metal, or in the dioxide form). Thus, the terms encompass those other forms which are converted to lead metal or lead dioxide when the battery is formed.

Current Collector (Grid) Alloy

The device lifespan is controlled primarily by the positive electrode, the substrate of which may be exposed to corrosion potential. Corrosion results in internal resistance increase, growth or creep deformation of the grid, which results in battery shortage or loss of the integrity of the device, and finally destruction of the electrode structure.

To avoid these problems, it has been found that it is advantageous to use the following alloy for the positive electrode current collector or grid: 0.05-0.08% calcium, 1-2% tin, optionally barium, and the balance lead (by weight).

The negative electrode current collector or grid preferably comprises 0.06-0.12% by weight calcium, 0-1% by weight tin, and the balance lead, or 1-2% tin, with the balance lead, or lead alone.

Capacitor Material

Capacitor material is applied to at least one region of the negative electrode, overlying the negative battery electrode material. The capacitor electrode material is commonly applied as a paste comprising the capacitor material components in a liquid (water or organic).

The capacitor material comprises a high Specific Surface Area (SSA) carbonaceous material in an amount of 30-70% by weight. These high specific surface area carbonaceous capacitor materials include activated (or active) carbon, carbon nanoparticles or nano carbon including carbon nano tube (CNT), mesoporous carbon and mixtures thereof. Specific surface areas of between 1000 and 3000 $m^2/g$, preferably 1000-2500 $m^2/g$. Currently, for cost reasons, activated carbon, which is not generally conductive, is a convenient source.

The high electrical conductivity carbonaceous materials that are present in the capacitor material in an amount of between 20-65 weight %, include carbon black, graphite, carbon nanotubes (CNT), vapour phase grown fibre or whisker, graphite fibres, and mixtures thereof. Carbon black is a powdered form of elemental carbon and is made by a range of processes, and any such carbon blacks may be used. Examples of different carbon blacks include acetylene black, channel black, furnace black, lamp black and thermal black, the surface area of which is less than 1000 $m^2/g$, far less than that of activated carbon.

However, some nano-carbons like CNT are conductive with fairly large surface area of around 1000 $m^2/g$, in case of which such carbon can work as one body of the above-mentioned two types of carbonaceous materials.

Capacitor carbonaceous materials are chemically carbon as a whole including impurities and foreign elements and radicals for intentional modification. Typical examples are functional radicals on the surface of activated carbon and boron in carbon black particles which are possibly usable.

Typical particle sizes for carbon blacks are 10-400 nm, although they tend to form aggregates of about 100-800 nm in size.

The capacitor material typically further comprises a binder. Any binders known in the art can be used, such as styrene butadiene rubber (SBR), chloroprene rubber, polytetrafluoroethylene (PTFE), polyvinylidene fluoride (PVDF), neoprene and carboxymethyl cellulose (CMC), or a mixture thereof. The binder is suitably used in an amount of 1-30% by weight of the capacitor mixture, preferably 5-20% by weight.

The capacitor material may also comprise a fibre reinforcement material (FRM). Fibre reinforcement materials with an aspect ratio of 20-500 are preferred. Suitable materials include plastic fibres such as polyester fibres (PE), polyethylene terepthalate (PET), polypropylene, polyacrylonitrile, as well as carbon or graphite fibres and vapour-grown whiskers. These fibres may be of between 1-30 μm in diameter, and 0.05-2 mm long. They suitably constitute 0-10% by weight of the capacitor material.

The capacitor material further comprises lead, preferably in a content of at least 0.1%, preferably 3-40% enabling control of negative potential. Through the potential change of the electrode, the lead component will either be in the metallic state or in an oxidised state as a compound with a counterion such as sulphate, in particulate form and/or adsorbed on the carbon surfaces.

Application of Capacitor Material

The capacitor material is suitably applied onto the negative battery electrode material as a layer. A viscous mix composed of the capacitor material and water or solvent can be coated by varied methods such as doctor blade, roll coater, dip coater and so on. Another application technique is adhesion or lamination by using a pre-formed sheet of capacitor material. From viewpoint of manufacturing, the preferred pre-formed sheet comprises capacitor material coated on porous thin sheet, such as a paper sheet, an unwoven sheet of plastic or glass fiber, and so on.

Before preparing the mix, at least a portion of the components of the capacitor material are mixed by milling, abrasion, grinding, dispersion, mixing or similar. This retains optimally high battery and capacitor functionality with compactness and high energy density. Furthermore, the resulting interface between the battery and capacitor material layers enables the optimal structure and property of the negative electrode to be achieved through the reactions of lead and carbon.

The thickness of the capacitor material (as a weight % of the total negative material mass—battery and capacitor) is preferably between 1% and 15%. Below 1% the capacitor layer is too thin to provide the advantages of hybrid performance. Hybrid performance becomes saturated at 10% by weight (of the negative material mass). Above this level increased capacitor material mass does not continue to improve performance, but can be tolerated up to 15% by weight.

Porosity of the capacitor material is required for ionic transport, and is essential for both the capacitor layer and the underlying battery negative battery material. This is particularly required when the capacitor material overlies 90% or more of the surface area of the negative battery electrode material. Porosity is preferably 50-90%.

The capacitor material is applied as a paste in a liquid, the liquid being evaporated away after application of the paste. The components are mixed and dispersed in a liquid such as water or organic solvent. Other additives may be included in the paste composition, especially binders, such as CMC, MC, PVA and polyacrylate. For organic pastes, NMP may be used as the solvent.

Physical Configuration

The electrodes may be of any suitable shape, and therefore may be in flat-plate form or in the form of a spirally-wound plate for the formation of either prismatic or spirally-wound cells. For simplicity of design, flat plates are preferred. The current collector is preferably in the form of a grid.

Electrolyte

In the case of lead-acid batteries, any suitable acid electrolyte may be used. The electrolyte may, for instance, be in the form of a liquid or a gel. Sulphuric acid electrolyte is preferred.

The electrolyte can contain additives such as alkaline or alkaline earth sulphates for the prevention of shortage and corrosion. Aluminum content is effective to keep the lifespan of the battery. Aluminum content is preferably 0.01-0.3 mol/L of Al ion, or 5-50 g/L of $Al_2(SO_4)_3 \cdot 18H_2O$.

Busbars or Conductors

The busbar of the lead-acid battery may be of any suitable construction, and may be made from any suitable conductive material known in the art. The term "connected to" used in the context of the busbars refers to electrical connection, although direct physical contact is preferred. In the case where the battery is not of a typical lead-acid battery configuration with busbars, any conductor may be used that does not involve circuitry external to the battery.

Other Battery Features

Generally, the components of the battery will be contained within a battery case with further features appropriate to the type of battery employed. This includes outer terminals (positive and negative) for electrical connection to the battery. The lead-acid battery may be of a flooded-electrolyte design or of a valve-regulated design. Where the lead-acid battery is a valve-regulated lead-acid battery, the battery may be of any suitable design, and may for instance contain gel electrolyte. Specific features of the battery unit appropriate to such designs are well known in the art of the invention.

The pressure that may be applied to the lead-acid plate group may lie in the range of 5-45 kPa for flooded electrolyte design, and from 20-100 kPa for valve regulated lead-acid battery design. The pressure has to be on the all faces of the plates, preferably equally, in order to protect mechanically the porous electrodes and therefore spacers of solid sheet or elastic body can be inserted between the container wall and the group.

Separators

Generally, each of the positive and negative electrodes is separated from adjacent electrodes by porous separators. Separators are particularly important when pressure is applied across the electrodes.

The separators maintain an appropriate separation distance between adjacent electrodes and maintain group pressure. Separators located between adjacent electrodes may be made from any suitable porous material commonly used in the art, such as porous polymer materials including polyethylene, unwoven fibrous materials and absorptive glass microfibre ("AGM"). For valve regulated lead acid batteries, AGM separators are preferred. For flooded electrolyte type batteries, the separators are preferably chosen from polymer membranes, such as polyethylene (PE) membranes which may optionally be reinforced with unwoven fibrous materials. Polyethylene separators are suitably between 1 and 1.5 millimeters thick, whereas AGM separators can be between 0.8 and 2.5 millimeters thick.

Formation of Lead Acid Batteries

The electrodes of lead-acid batteries need to be "formed". This can take place either in bulk with like electrodes prior to assembly of the battery ("tank formation") or in the assembled battery. The formation operation is well known in the field. It is to be understood that the references to "lead-based" and "lead dioxide-based" materials are used to refer to lead or lead dioxide itself, materials containing the metal/metal dioxide or to materials that are converted into lead or lead dioxide, as the case may be, at the given electrode.

As is indicated by the language used above, the lead-acid battery contains at least one of each type of electrode. The number of individual cells (made up of a negative and positive plate) in the battery depends on the desired voltage of each battery. For a 36-volt battery appropriate for use as a mild hybrid electric vehicle battery (which may be charged up to 42 volt), this would involve the use of 18 cells.

Functions and Features

The devices of the present application work advantageously well under partial state-of-charge (PSOC) conditions, while some features like charge and discharge performance are better than conventional lead acid batteries. Under PSOC, sulfation or hard $PbSO_4$ crystal growth is subdued, enabling operation under PSOC cycling for a large throughput and to keep device operational during PSOC long rest periods. Charge acceptance and deep discharge performance are substantially enhanced, which is on the same course of $PbSO_4$ characteristics. Furthermore, the existence of a capacitor region enhances the reactivity of battery reaction, resulting in capacity improvement. PSOC is practically divided into 2 ranges, 80-98% SOC and 50-80%. The former shallow PSOC is for discharge performance and later deep PSOC is for recharge or regenerative performance.

Both VRLA and flooded versions can be used in the wide variety of secondary battery applications, including automotive and industrial (stationary, and traction) applications.

While flooded lead acid batteries are nowadays used as automotive SLI (conventional starting-lightening-ignition) batteries, the flooded version described herein in PSOC can now be used in these applications, and provide further advantages such as idling stop, regenerative braking and start assist, all of which are required for good fuel economy in automotive vehicles. Such hybrid electric vehicles (HEV) using flooded electrolyte batteries are called micro-HEV. Although VRLA versions of the battery also work well, the flooded version has the two advantages of low cost and large heat capacity. Automotive batteries are generally mounted in the underhood engine compartment, where the battery is exposed to much heat flow from the engine and electric circuits. VRLA batteries of smaller heat capacity are prone to thermal runaway and accelerated water loss. Therefore VRLA versions of the batteries should be mounted in the trunk/boot room area. In this application PSOC is as shallow as 80-98%, preferably 90-98%.

The VRLA version of this battery for automotive applications has a deeper PSOC, so it works well for regenerative braking to recover braking energy, which improves fuel economy. This is suitable for use in a type of HEV, referred to as mild-HEV.

EXAMPLES

A lead-acid battery of one embodiment of the invention is illustrated schematically in FIGS. 1 and 2. It is noted that for ease of explanation, the illustrated battery has fewer cells than the number of cells that would typically be contained in a commercial form of the battery.

The battery comprises three lead dioxide positive plate electrodes (1) and two negative electrodes (2). The negative electrodes comprise a current collector or grid (3) with a lead-containing battery electrode paste composition applied to it (4) and capacitor material paste applied onto the surfaces of lead negative material (5). This includes the faces of the electrode that are opposite the positive electrodes.

Formation of the electrode is conducted in the manner known in the art. In a variation on this embodiment that is simpler to manufacture, a lead based negative electrode is prepared with lead pasted by conventional techniques to the main body section in lead paste material, and, after it is cured and dried, the capacitor material is pasted (eg by dipping) onto the surfaces of this lead based negative electrode. Formation may take place before or after application of the capacitor electrode material. The positive (1) and negative electrodes (2) are positioned in an alternating arrangement in a battery case (6).

The positive lead dioxide electrodes (1) and negative electrodes (2) of the embodiment illustrated in FIG. 1 are 76 millimeters wide by 76 millimeters high by 0.8-1.7 millimeters thick. The capacitor material region (5) of the negative electrode takes up 0.5 millimeters of the thickness of the negative electrode, or up to 10% by weight of the negative battery electrode material.

Separators (7) are located between the adjacent electrodes. Absorptive glass microfibre (AGM) separators (7) of 1.1 millimeters in thickness are positioned between the positive (1) and the negative electrodes (2).

The battery case (6) is filled with sulfuric acid solution (8). The positive electrodes are connected to a positive busbar (9), and the negative electrodes connected to a negative busbar (10).

Example 1—E1

A monoblock battery (87 mm W×150 mm L×110 mm H) of 6 cells in a VRLA arrangement was constructed with following components, processes and conditions;

Negative electrode: grid (Pb with 0.1% Ca) of 76 mm W×76 mm H×1.4 mm thickness, 5 plates/cell Aqueous mix (density 4.0) of lead oxide, expander, polyester fiber and sulfuric acid was applied to grids, cured, dried and then tank formed according to conventional methods.

The capacitor mix is composed of

| | |
|---|---|
| Carbon black (furnace black) | 43 mass parts |
| Active carbon (SSA 2300 m²/g) | 38 |
| Polyester fiber (20 μm diameter, aspect ratio 150) | 5 |
| Chloroplane rubber | 10 |
| CMC | 4 |
| Water | 280□ based on the 100 mass parts of 100% solids content. |

The mix is applied onto both sides of all formed plates by the doctor blade method and dried. Capacitor mass was 5% of total negative active mass (dry base) with 75% porosity.

Positive electrode: grid (Pb with 0.035% Ca, 0.007% Ba, 1.8% Sn) of 76 mm W×76 mm H×1.7 mm thickness, 4 plates/cell.

Aqueous mix (density 4.2) of lead oxide, sulfuric acid and polyester fiber is applied to the grid, cured, dried and tank formed according to conventional methods.

Separator: AGM 1.1 mm thick 6 groups of both electrodes interleaved with AGM were connected in a cast-on-strap (COS) machine and inserted into 6 cells with group pressure of 60 kPa, and sealed, and then electrolyte was poured in.

Electrolyte: sulphuric acid aqueous solution of specific gravity 1.30 containing 30 g/L of $Al_2(SO_4)_2 \cdot 18H_2O$.

Activation was conducted as follows:

Constant-current charge of 1 A for 15 hr;

Constant-current discharge of 2 A until voltage down to 10.5V;

Constant-current charge of 1 A for 15 hr;

Capacity in 5 hr-rate was measured as 10.2 Ah.

After activation, a battery for study was dismantled, the capacitor-layer was chemically analysed and the electrode section was examined by EPMA. The lead content was 1.9% and distributed in a way that the lead was enriched near the interface of the battery and capacitor-masses.

Battery capacity of discharge was measured at 5 hr rate.

Reference Example 1—R1

In place of the negative electrode of Example 1, the negative electrodes were prepared to have a type of reference configuration as follows:

A half area of the negative electrode was pasted with the battery mix, and the other half was pasted with the capacitor mix. The halves were a left-hand side and a right-hand side, coated on both faces with the battery material, or capacitor material, respectively.

Reference Example 2—R2

In place of the container used in Example 1, new larger one (87 mmW×220 mmL×110 mmH) was used to insert the following plate group composed of the battery and capacitor portions keeping the same group pressure of 60 kPa. The battery portion was the same to above E1 and capacitor portion was composed of the 5 capacitor negative electrodes and 4 positive electrodes alternatively arranged in series and interleaved with AGM of 0.5 mm thickness. The both electrodes were constructed with 0.6 mm thick lead sheet substrates with 45% punched-openings by coating capacitor and positive battery mixes, respectively and the dry thicknesses of the negative and positive electrodes were about 0.9 and 0.7 mm thick, respectively. The substrates were the same alloys as E-1. The mass of capacitor material was 5% by weight of the battery material. The positive electrode was tank-formed before stacking and assembling.

All negative and positive electrodes were welded (COS) to be electrically connected in parallel, respectively, and inserted into 6 cells and sealed. Then electrolyte was poured in. Activation was conducted similarly.

Capacities were measured and results were listed as follows:

| | Capcity@5 hr-Rate | Energy Density (Relative) |
|---|---|---|
| E-1 | 10.2 Ah | 100% |
| R-1 | 5.2 | 51% |
| R-2 | 10.1 | 68% |

Coating the capacitor layer onto the lead acid battery plate can have the benefits of the lead acid battery plate providing energy, while the capacitor electrode gives power. E-1 with layered configuration shows clearly the highest values, compared with the other two configurations.

Example 2—E2

The above Examples 1 was repeated, but with the following changes:

Composition of Capacitor Mix

| | |
|---|---|
| Acetylene black in place of furnace black | 25 mass % |
| Active carbon (SSA 1900 m₂/g) | 62% |
| Vapor-grown carbon whisker | 3% |
| SBR | 7% |
| Carboxy methyl cellulose | 3% |
| Water | 300% |

Mass of the capacitor layer was 10% of total negative mass and porosity was 65%.

The results of capacity and cycle life are shown in Table 1

Example 3—E3

The above Example 1 was repeated, but with the following changes:

Composition of Capacitor Mix

| | |
|---|---|
| Furnace black | 30 mass % |
| Expanded graphite | 15 mass % |
| Active carbon (SSA 1900 m$^2$/g) | 44% |
| Polyester fiber 20 μm diameter, aspect ratio 150 | 3% |
| SBR in place of Chloroplane | 6% |
| Carboxy methyl cellulose (CMC) | 3% |
| Water | 300% |

Mass of capacitor layer was 8% and porosity was 65%. The results are shown in Table 1.

Example 4—E4

The above Example 1 was repeated, but with the following changes:
Composition of Capacitor Mix

| | |
|---|---|
| Acetylene black | 23 mass % |
| Vapor grown carbon whisker (fibre) | 11 |
| Active carbon (SSA 2300 m$^2$/g) | 15 |
| Active carbon (SSA 1200 m$^2$/g) | 37 |
| Polyester 20 μm diameter aspect ratio 150 | 4 |
| SBR | 7 |
| CMC | 3 |

The mass of capacitor layer was 10% and porosity was 65%.
The results are shown in Table 1.

Example 5—E5

The above Example 1 was repeated, but with the following changes:
Mass of capacitor layer was 2% with 65% porosity.

Example 6—E6

The above Example 1 was repeated, but with the following changes:
Capacitor coating was applied onto only one side of the plates. The mass was 5% of total negative mass.

Example 7—E7

The above Example 1 was repeated, but with the following changes:

| | |
|---|---|
| Carbon black (Furnace black) | 22 mass % |
| Active carbon (SSA 2300 m$^2$/g) | 69% |
| Carbon whisker (same as E-2) | 3% |
| Chloroplane rubber | 4% |
| CMC | 1% |

Example 8—E8

The above Example 1 was repeated, but with the following change:

| | |
|---|---|
| Carbon black (Furnace black) | 65 mass % |
| Active carbon (SSA 2300 m$^2$/g) | 30% |
| Polyester fiber (same as E-4) | 1% |
| Chloroplane rubber | 3% |
| CMC | 1% |

Example 9—E9

In place of the positive grid alloy in E-1, an alloy without Ba was used. The electrolyte did not contain Al additive.
Alloy element: Sn 1.5 mass % Ca 0.06% Al 0.002%

Reference Example 3—R3

The above Example 1 was repeated, but with the following changes:
No capacitor material coating was applied.

Reference Example 4—R4

The above Example 1 was repeated, but with the following changes:

| | |
|---|---|
| Carbon black (Furnace black) | 65 mass % |
| Active carbon (SSA 2300 m$^2$/g) | 20% |
| Polyester fiber (same as E-4) | 5% |
| Chloroplane rubber | 7% |
| CMC | 3% |

Reference Example 5—R5

The above Example 1 was repeated, but with the following changes:

| | |
|---|---|
| Carbon black | 17 mass % |
| Active carbon (SSA 1900 m$^2$/g) | 72% |
| Polyester fiber (same as E-4) | 4% |
| Chloroplane rubber | 5% |
| CMC | 2% |

Reference Example 6—R6

In place of the layered coating in E-1, 5% of dried and pulverized capacitor mix was added to the negative battery mix.

With regard to above batteries, battery performance for hybrid electric vehicle applications (HEV) was tested as follows:

Cycle pattern: Battery was discharged in 2 A for 1 hr reaching 80% SOC, then
500 sets of discharge of 50 A for 1 sec and charge of 20 A for 1 sec were applied,
then 510 sets of charge of 30 A for 1 sec and rest for 1 sec.
The above sets in series were counted as 1 cycle and cycle life was determined when battery voltage reached 0V.

After the test of E1, the lead content and its distribution through the capacitor layer section was checked. It was confirmed that lead impregnation proceeded up to 30.2 weight % on average. Hereafter lead content in the capacitor mass is calculated as an average of the before- and after-values.

The results are shown in Table 1.

TABLE 1

| Sample | Capacity | Cycle life | Pb Content |
|---|---|---|---|
| E-1 | 10.2 Ah | 820 cycle | 16.1% |
| E-2 | 9.9 | 830 | 17.7 |
| E-3 | 10.1 | 750 | 14.9 |
| E-4 | 10.4 | 850 | 17.0 |
| E-5 | 9.7 | 620 | 13.0 |
| E-6 | 9.6 | 500 | 10.9 |
| E-7 | 10.0 | 520 | 9.9 |
| E-8 | 9.9 | 510 | 11.1 |
| E-9 | 10.2 | 640 | 12.7 |
| R-1 | 5.2 | 190 | 0.9 |
| R-2 | 10.1 | 580 | 6.8 |
| R-3 | 9.3 | 180 | □ |
| R-4 | 9.7 | 340 | 8.8 |
| R-5 | 9.7 | 310 | 7.6 |
| R-6 | 9.9 | 410 | — |

All examples of this invention had a longer cycle life under PSOC operation. E-9 using a conventional Ba-free alloy has a shorter life, due to the positive grid corrosion and resulting increased internal resistance. Regarding the reference examples, R-3 of conventional battery (Control) without capacitor material showed the poorest result. R-4 and R-5 with capacitor material outside the levels claims performed poorer.

R-1 and R-2 with an electrode configuration different from outside the claimed configuration, which were poorer in energy density as previously mentioned, showed shorter life. It is postulated that this is related to the non-existence of the interface between the battery- and capacitor-materials. R-6 containing the mixture of both battery and capacitor materials was also poor in PSOC cycle life.

Example 11—E11

A monoblock battery (126 mm W×236 mm L×200 mm H) of 6 cells (JIS B24 size) in flooded arrangement was constructed with following components, processes and conditions:

Negative electrode: grid (Pb with 0.1% Ca) of 102 mm W×108.5 mm H×1.5 mm thickness, 7 plates/cell Aqueous mix (density 4.0) of lead oxide, expander, polypropylene fiber and sulfuric acid was applied to the grids, cured and dried according to conventional methods.

The Capacitor mix is composed of:

| | |
|---|---|
| Carbon black (furnace black) | 43 mass % |
| Active carbon (SSA 2300 m$^2$/g) | 38% |
| Polypropylene fiber (15 μm diameter, aspect ratio 100) | 5% |
| Chloropteane rubber | 10% |
| CMC | 4% |
| Water | 280% |

The capacitor mix is applied onto both sides of all plates by the doctor blade method and dried. The capacitor mass was 5% of total negative active mass (dry base) with 75% porosity.

Positive electrode: grid (Pb with 0.035% Ca, 0.007% Ba, 1.8% Sn) of 102 mm W×108.5 mm H×1.7 mm thickness, 6 plates/cell Aqueous mix (density 4.2) of lead oxide, sulfuric acid and polyester fiber is applied to grid, cured and dried according to conventional methods.

Separator: Porous polyethylene (PE) sheet covered with an unwoven glass fiber layer, 1.0 mm thick Electrolyte: sulfuric acid with specific gravity 1.24.

After enveloping positive plates with separator sheet, 6 groups of both plates were connected in a COS machine and then inserted into 6 cells of a monoblock container with group pressure of 20 kPa. A cover-plate was welded on and then electrolyte was poured in. Then container formation was conducted in the water bath of 35° C. applying total electricity (76 Ah), that is 180% of theoretical value, for the period of 10 hrs.

Battery capacity was measured as 42.0 Ah at 5 hr-rate.

Battery performance for automotive idling stop cycle was tested as follows:

| | |
|---|---|
| Discharge | 45 A for 59 sec and 300 A for 1 sec |
| Charge | 100 A for 60 sec @ 14.0 V |

Above discharge-charge was repeated 3600 cycles followed by resting for 48 hr. This procedure was continued in the 25° C. environment until battery voltage reduced down to 7.2V—that is the cut-off voltage for cycle life.

The results are shown in Table 2.

Example 12—E12

The above Example 11 was repeated, but with the following changes:

Group pressure was set as 40 kPa, and electrolyte was added with 15 g/L of $Al_2(SO_4)_3 \cdot 18H_2O$.

Example 13—E13

The above Example 11 was repeated, but with the following changes:

Group pressure was changed to 8 kPa.

Example 14—E14

The above Example 11 was repeated, but with the following changes:

The Capacitor mix is composed of:

| | |
|---|---|
| Carbon black (Furnace black) | 50% |
| Active carbon (SSA 2300 m$^2$/g) | 35% |
| Polyester fiber | 3% |
| Chloroplane rubber | 8% |
| CMC | 4% |
| Water | 280% |

The separator was changed to porous PE sheet without unwoven glass fiber layer and group pressure was changed to 15 kPa.

Reference Example 11—R11

The above Example 11 was repeated, but with the following changes:

No capacitor coating was applied.

Reference Example 12—R12

The above Example 11 was repeated, but with the following changes:

Group pressure was 55 kPa.

Reference Example 13—R13

The above Example 11 was repeated, but with the following changes:
Group pressure was 3 kPa.

TABLE 2

| Sample | Capacity (Ah) | Cycle life | Pb content (%) |
|---|---|---|---|
| E-11 | 42.0 | 75,000 | 12.0 |
| E-12 | 38.3 | 80,000 | 14.1 |
| E-13 | 43.4 | 65,000 | 11.2 |
| E-14 | 44.5 | 55,000 | 9.9 |
| R-11 | 40.1 | 25,000 | 6.9 |
| R-12 | 32.1 | 80,000 | 7.9 |
| R-13 | 44.0 | 11,000 | 4.8 |

In the case of R-12, Ah capacity was reduced while cycle life was high. In the case of R-13 short life was due to detachment of the capacitor layer.

Many modifications may be made to the embodiments and examples described above without departing from the spirit and scope of the invention.

The claims defining the invention are as follows:

1. A lead-acid battery comprising:
at least one negative electrode comprising lead-based battery electrode material and at least one region of capacitor material overlying the lead-based battery electrode material, each electrode being in electrical connection to an outer terminal of the battery, and
at least one positive electrode which is a lead-dioxide based battery electrode without a capacitor material, each positive electrode being in electrical connection to a second outer terminal of the battery,
separator interleaving the facing electrodes
electrolyte filling at least the space of the electrodes and separators
wherein the capacitor material overlying the lead-based battery electrode material comprises 34-65% by weight of a high electrical conductivity carbonaceous material, 35-52% of a high specific surface area carbonaceous material, at least 0.1% lead and binder, and
wherein the capacitor material of each negative electrode constitutes between 1 and 15% by weight of the lead-based battery electrode material.

2. The lead-acid battery of claim 1, wherein the binder is present in an amount of between 1 and 30% by weight.

3. The lead-acid battery of claim 1, wherein the capacitor material consists of 34-65% high electrical conductivity carbonaceous material, 35-52% high specific surface area carbonaceous material, 3-40% lead, 5-20% binder and 2-10% fiber reinforcement material.

4. The lead-acid battery of claim 1, wherein a layer of capacitor material overlies all surface areas of the lead-based battery electrode material that face a positive electrode.

5. The lead-acid battery of claim 1, wherein the negative electrodes each comprise a current collector, which is coated on both faces with lead-based battery electrode material, and a layer of capacitor material overlying each face of lead-based battery electrode material that is opposite to a positive electrode.

6. The lead-acid battery of claim 1, wherein the capacitor material overlying the lead-based battery electrode material has a porosity of between 50-90%.

7. The lead-acid battery of claim 1, wherein the electrolyte is composed of sulfuric acid aqueous solution containing 0.01-0.3 mol/L of aluminum or 5-50 g/L of $Al_2(SO_4)_3 \cdot 18H_2O$.

8. The lead-acid battery of claim 1, which is a valve regulated lead acid battery.

9. The lead-acid battery of claim 8, further comprising absorptive glass microfibre or absorbed glass mat separators between adjacent electrodes.

10. The lead-acid battery of claim 8, wherein the battery has a pressure on the electrodes of between 20 and 100 kPa.

11. The lead-acid battery of claim 8, which is operable at between 95-50% SoC.

12. The lead-acid battery of claim 1, which is a flooded electrolyte lead-acid battery.

13. The lead-acid battery of claim 12, wherein the battery has a pressure on the electrodes of between 5 and 45 kPa.

14. The lead-acid battery of claim 12, wherein the separators are interleaving the facing electrodes porous polymer separators.

15. The lead-acid battery of claim 14, wherein the porous polymer separators further comprise unwoven fibrous material reinforcement.

16. The lead-acid battery of claim 12, which is operable at between 98-80% SoC.

17. An automobile comprising a lead-acid battery of claim 12, an internal combustion engine and an alternator.

18. A lead-acid battery comprising:
at least one negative electrode comprising lead-based battery electrode material and at least one region of capacitor material overlying the lead-based battery electrode material, each electrode being in electrical connection to an outer terminal of the battery, and
at least one positive lead-dioxide based battery electrode without a capacitor material, each positive electrode being in electrical connection to a second outer terminal of the battery,
separator interleaving the facing electrodes
electrolyte filling at least the space of the electrodes and separators
wherein the capacitor material overlying the lead-based battery electrode material comprises 34-65% by weight of a high electrical conductivity carbonaceous material, 35-52% of a high specific surface area carbonaceous material, at least 0.1% lead and binder, and a polymeric fiber reinforcement material in an amount up to 10% by weight, and
wherein the capacitor material of each negative electrode constitutes between 1 and 15% by weight of the lead-based battery electrode material.

19. A lead-acid battery comprising:
at least one negative electrode comprising lead-based battery electrode material and at least one region of capacitor material overlying the lead-based battery electrode material, each electrode being in electrical connection to an outer terminal of the battery, and
at least one positive lead-dioxide based battery electrode without a capacitor material, each positive electrode being in electrical connection to a second outer terminal of the battery,
separator interleaving the facing electrodes
electrolyte filling at least the space of the electrodes and separators
wherein the capacitor material overlying the lead-based battery electrode material comprises 34-65% by weight of a high electrical conductivity carbonaceous material, 35-52% of a high specific surface area carbonaceous material, at least 0.1% lead and binder, and a non-conductive polymeric fiber reinforcement material in an amount up to 10% by weight, and wherein the capacitor material of each negative electrode constitutes between 1 and 15% by weight of the lead-based battery electrode material.

20. The lead-acid battery of claim 1, wherein the capacitor material of each negative electrode constitutes between 5 and 10% by weight of the lead-based battery electrode material.

21. The lead-acid battery of claim 1, wherein the positive electrode comprises a positive current collector, formed from a lead alloy comprising 0.005-0.15% by weight Ba, 0.03-0.08% by weight Ca, 0.4-2.2% by weight Sn, and lead.

22. The lead-acid battery of claim 18, wherein the capacitor material of each negative electrode constitutes between 5 and 10% by weight of the lead-based battery electrode material.

23. The lead-acid battery of claim 19, wherein the capacitor material of each negative electrode constitutes between 5 and 10% by weight of the lead-based battery electrode material.

24. The lead-acid battery of claim 19, wherein the positive electrode comprises a positive current collector, formed from a lead alloy comprising 0.005-0.15% by weight Ba, 0.03-0.08% by weight Ca, 0.4-2.2% by weight Sn, and lead.

25. The lead-acid battery of claim 21, wherein lead constitutes the balance of the lead alloy.

* * * * *